United States Patent [19]
Fuqua

[11] 3,710,673
[45] Jan. 16, 1973

[54] FASTENERS
[75] Inventor: Lloyd T. Fuqua, Fortville, Ind.
[73] Assignee: General Motors Corporation, Detroit, Mich.
[22] Filed: Aug. 23, 1971
[21] Appl. No.: 173,872

[52] U.S. Cl. .................85/75, 85/81, 151/41.75
[51] Int. Cl. ..........................................F16b 13/04
[58] Field of Search............85/66, 69, 75, 79, 80, 81; 151/41.75

[56] References Cited

UNITED STATES PATENTS

| | | | |
|---|---|---|---|
| 2,246,722 | 6/1941 | Del Camp | 151/41.75 |
| 2,779,377 | 1/1957 | Flora | 85/81 |
| 2,972,495 | 2/1961 | Yalen | 85/69 |
| 3,525,285 | 8/1970 | Niel et al. | 85/75 |

FOREIGN PATENTS OR APPLICATIONS

| | | | |
|---|---|---|---|
| 991,341 | 6/1951 | France | 85/79 |
| 1,262,004 | 4/1961 | France | 85/75 |

Primary Examiner—Marion Parsons, Jr.
Attorney—J. L. Carpenter et al.

[57] ABSTRACT

A fastener for securing together two adjacent apertured members in juxtaposition to each other including a threaded expander member for insertion through the apertured members with retainer means thereon to engage one of the apertured members, a retainer member having resilient arms adapted to engage the other of the apertured members slidably telescoped over the expander member and, screw means loosely connected to the retainer member and threaded into the expander member to effect sliding movement of the retainer member relative to the expander member upon threaded axial movement of the screw means in the expander member to expand and retract the resilient arms of the retainer member into and out of engagement with the other apertured member.

5 Claims, 4 Drawing Figures

PATENTED JAN 16 1973

3,710,673

INVENTOR.
Lloyd T. Fuqua
BY
Arthur N. Krein
ATTORNEY

FASTENERS

This invention relates to fasteners and, in particular, to a blind-type, reusable and decorative fastener.

In the manufacture of products from sheet metal panels, it is often necessary to releasably attach adjacent panels to each other or to attach other elements to a support panel by the use of suitable fasteners. Conventionally, this is done by threaded fasteners, such as bolts and nuts, where access is available to both sides of the support panel so that the screw can be inserted from one side of the panel while the nut is attached from the opposite side of the panel. However, there are occasions wherein one side or back side of the support panel is not readily accessible and, in these situations, it is necessary to use a blind-type fastener which can be inserted from one side of the support panel to be secured thereto to support or retain another panel or element to the support panel.

Accordingly, it is the primary object of this invention to provide a blind-type fastener capable of being inserted into apertures in two juxtapositioned members to align and retain these members with respect to each other and then, upon further actuation of the fastener, to effectively secure the two members to each other.

Another object of this invention is to provide a push-type blind fastener that is self-retaining when inserted into an apertured panel and which is capable of being secured to the panel and then, if necessary, unsecured from the panel for reuse.

These and other objects of the invention are attained by means of a fastener comprising an expander member including a body having a central, axial, threaded, through bore with a panel engaging shoulder on the outer periphery thereof, the body being provided with two axially aligned slots in the outer periphery thereof with cam portions on the inner surface thereof to slidably receive the legs of a U-shaped retainer member made of spring material, a screw member being connected to the retainer member and threaded into the threaded bore of the expander member, a knurled cup-shaped cap member being secured to the free end of the screw member to permit manual threading and unthreading of the screw member in the threaded bore of the expander member, the cup-shaped member being positioned to partially enclose both the expander member and the retainer member.

For a better understanding of the invention, as well as other objects and further features thereof, reference is had to the following detailed description of the invention to be read in connection with the accompanying drawings, wherein.

Figure 1:
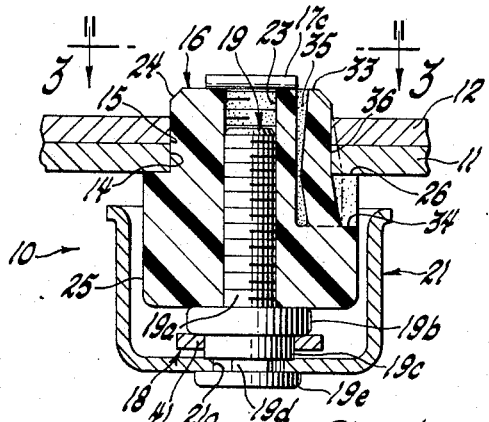
FIG. 1 is a sectional view of the fastener of the invention mounted in apertured panel members in position to retain and align these members.

Referring now to the drawings, the fastener of the invention, generally designated 10, is used as a blind fastener to secure a panel 11 or similar member in juxtaposition to a basal or support panel 12, both being provided with apertures 14 and 15, respectively, to receive the fastener.

The fastener 10 includes an expander member 16 slidably guiding the legs 17 of a retainer member 18 which is axially movable thereon by means of a threaded fastener or screw member 19, which preferably is operated by a tool in the form of a decorative, inverted, cup-shaped cap member 21 fixed to the unthreaded end of the screw member 19.

The expander member 16, which may be molded of a suitable plastic, such as nylon or delrin, is in the form of a stepped tubular body with a central threaded bore 23 therethrough, the threads being preferably left-hand threads for a purpose to be described. The tubular body includes an upper body portion 24 having an outside diameter slightly less than the diameter of the apertures 14 and 15 in the panels 11 and 12, respectively, whereby this portion of the expander member 16 can be readily inserted into these apertures while the lower portion 25 of the body is of a substantially larger diameter to provide an annular shoulder 26 of sufficient size so as to firmly abut against the outside surface of panel 11 when positioned as shown in FIG. 1.

The expander member 16 is also provided with opposed axially extending channels or slots 27, each of which is defined by flat inner surfaces 28 and 29 connected together by a cam or ramp 31 extending radially outward from the surface 28 to surface 29, and side walls 32 spaced apart from each other a sufficient distance to slidably receive a leg 17 of retainer member 18 therebetween.

In order that the expander member 16 can serve to align the apertures in the panels and to initially retain these panels in aligned position, at least one flexible tapered leg 33, formed integral with the lower body portion 25, is positioned to extend upward from a radial shoulder 34 in alignment adjacent to an axial extending semicircular slot or recess 35 provided on the exterior of the body portions 24 and 25 between the slots 27. The leg 33, in an as molded condition, has a tapered or inclined outer peripheral surface 36 which, adjacent to the top of the upper portion 24, serves as a continuation of the outer peripheral surface of this portion, while the bottom outer peripheral surface of the leg extends substantially radially outwardly from the periphery of the upper portion 24. With this arrangement, when the upper portion 24 of the expander member 16 is exerted through the apertures 14 and 15 in panels 11 and 12, the leg 33 moves from its as molded position, as shown by broken line in FIG. 1 to the position shown in solid outline therein with the leg 33 thus forced radially inward. In this position, the leg 33 tends to return to its as molded position exerting radial outward force against the apertured surfaces of the panels to hold the retainer in the position shown in FIG. 1 and to maintain alignment of the apertures 14 and 15 in panels 11 and 12, respectively.

The retainer member 18, formed of suitable spring material, such as spring steel, is substantially U-shaped with two spring legs 17 interconnected at their lower ends by an apertured base member 41. Each of the legs 17 is provided at its upper or free end with a radial inward stepped leg portion 17a connected to the lower portion of the leg 17 by a cam engaging portion 17b, each leg portion 17a terminating at its opposite or free end in a radially outward extending tab 17c. Thus, the upstanding portions of the leg 17 are formed complementary to the surfaces 28, 31 and 29 of the slots 27 in the expander member so that when the retainer member 18 is assembled thereto in its normal retracted position, the legs 17 of the retainer member are slidably received within the slots 27 with the leg 17 substantially at right angles to the apertured base member 41, the leg portion 17a abutting against the flat surface 28 in the slots 27 so that the tabs 17c lie in a plane adjacent to the top or free end of the body portion 24 of the expander member 16, as shown by the solid lines in FIG. 2.

Figure 2:
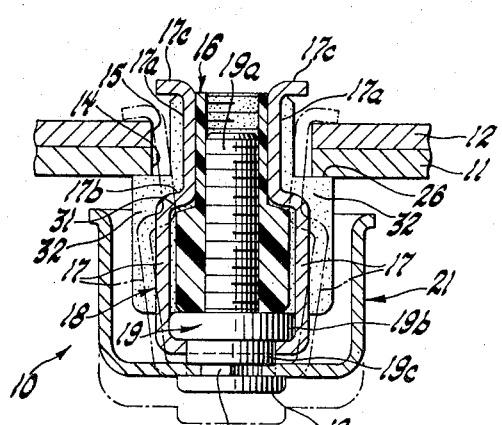
FIG. 2 is a sectional view similar to FIG. 1 but at right angles thereto.

When the retainer member 18 is moved axially relative to the expander member 16, in a downward direction, as seen in FIG. 2, the cam engaging portions 17b of the legs 17 engage the ramps 31 of the slots 27 causing the legs to be bent apart from each other to a position in which the tabs 17c will engage one side of panel 12 adjacent to the aperture 15 therein, as shown in broken lines in this figure, whereby the panels 11 and 12 are sandwiched between these tabs 17c of the retainer member 18 and the shoulder 26 of expander member 16.

To effect axial movement of the retainer member 18 relative to the expander member 16, the retainer member is secured to one end of the threaded fastener or screw member 19 for axial movement therewith while being rotatably supported relative thereto. The screw member 19 is provided with a threaded portion 19a receivable in the threaded bore 23 of the expander member 16 and is provided at its other end with a suitable head for engagement by a tool, which in the preferred embodiment disclosed is a cup-shaped cap member 21 fixed thereto.

As shown in the drawings, the screw member is provided with an enlarged annular shoulder ring 19b adjacent to the threaded portion 19a, a reduced annular portion 19c rotatably receivable in the apertured base member 41 of retainer member 18 and at its end with a hex head portion 19d for engagement in the hex-shaped aperture 21a in the bottom wall of cap member 21. An end portion of the hex head portion 19d of the screw member 19 is then peened over after assembly to the cap member to provide a retaining flange 19e so that the retainer member 18 and cap member 21 are retained between the shoulder ring portion 19b and the retaining flange 19e of the screw member, as seen in FIGS. 1 and 2.

Preferably, the cap member 21 is knurled on its outer peripheral surface and is positioned on the screw member 19 so that when the screw member is assembled to the expander member 16, the cap member forms a decorative partial enclosure for the expander member and retainer member.

Figure 3:
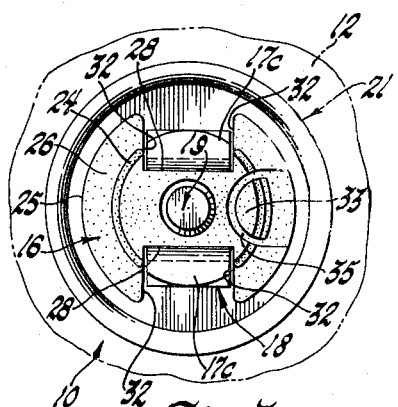
FIG. 3 is a fragmentary, top view of a fastener of the invention taken along line 3—3 of FIG. 1 showing the fastener mounted in apertured panel members but not secured thereto, with parts of the panels broken away to show the fastener details; and, FIG. 4 is an exploded, perspective view of a fastener of the invention showing the various parts of the fastener.
Figure 4:
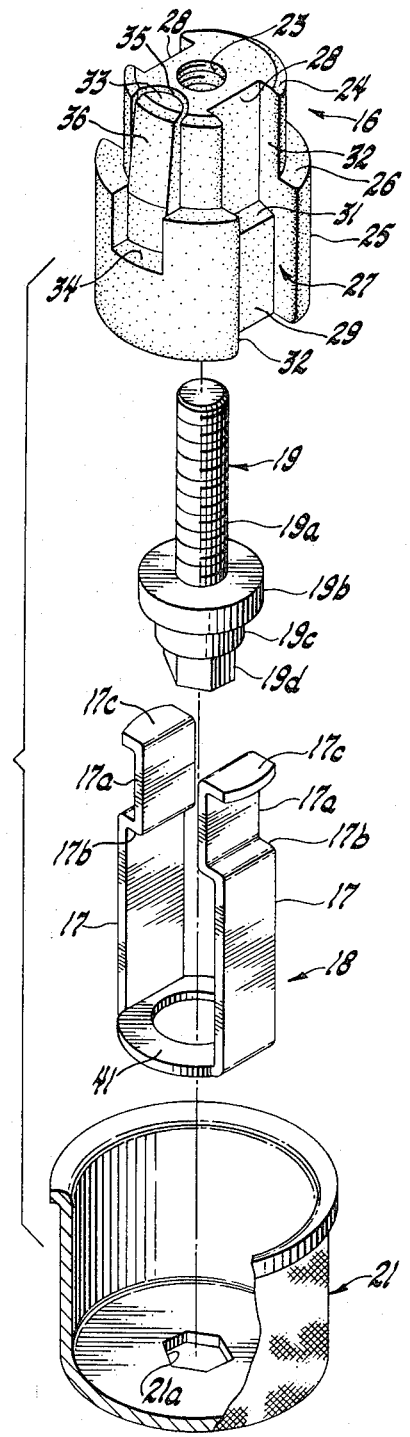

In operation, the screw member 19 is threaded fully into the expander member 16 so that the legs 17 of the retainer member 18 are in their retracted position as shown in FIGS. 1 and 3 and as shown in solid outline in FIG. 2. The screw thread of screw member 19 and the threads in the expander member 16 are preferably left-handed threads to allow clockwise rotation of cap member 21 when securing the subject fastener to the panel members 11 and 12, since this is the normal direction of rotation for securing a threaded fastener. In this case though, the screw member 19 when rotated clockwise is actually partially withdrawn from the expander member 16 but this movement is used to effect fastening of the subject fasteners to the panels 11 and 12.

The fastener, with the screw member fully threaded into the expander member, is then ready to be inserted through the apertures 14 and 15 in the panels 11 and 12, respectively, to the position shown in FIG. 1, sufficient interference being provided in the flexible leg 33 of the expander member to prevent rotation of the fastener with respect to the panel members and, in addition, will assist in correcting any slight misalignment between apertures 14 and 15 in these panels. In this position, the shoulder 26 of the expander member abuts against the bottom of panel 11. When the cap member 21 is rotated clockwise, the screw member 19 begins to withdraw from the expander member, moving downward, as seen in relation to FIGS. 1 and 2, moving the retainer member 18 axially relative to the expander member so that the legs 17 are cammed outward causing the tabs 17c to catch on the backside, topside as seen in FIG. 2, of the panel 12. Continued rotation of the cap, and therefore the screw member 19, then applies pressure by means of the tabs 17c on the backside of panel 12 and by the shoulder 26 on the underside of panel 11, holding these panels firmly together.

To remove the fastener, counterclockwise rotation of the screw member will again advance the screw member to the position fully threaded into the expander member, shown in FIG. 1, to permit the legs 17 of the retainer member to again retract to the position shown by solid line in FIG. 2 so that the fastener can then be removed from the panels 11 and 12 and be ready for re-use.

What is claimed is:

1. A reusable blind fastener adapted for passage into aligned apertures in a panel and a support panel comprising an expander member adapted for insertion into the apertures in the panel and the support panel, a retainer member including an apertured base member with a pair of spaced resilient legs extending from said base member and having outwardly projecting means adapted for engagement with one side of the support panel, said legs having cam engaging portions thereon for engagable coaction with said expander member to effect bending movement of said legs relative to said base member upon axial relative movement between said retainer member and said expander member, said expander member including a stepped tubular body having a portion of reduced diameter insertable into the apertures of the panel and support panel and an external shoulder engagable with one side of the panel and with opposed axial extending channels having cam surfaces therein for slidably receiving said legs of said retainer member, a central threaded axial bore in said stepped tubular body and, screw means rotatably fixed to said retainer member and threaded in said threaded bore of said expander member to effect axial movement of said retainer member relative to said expander member.

2. A reusable blind fastener according to claim 1 wherein said expander member includes a flexible tapered leg integral with said stepped tubular body to extend axially therewith, with a portion of said tapered leg normally extending radially outward of said portion of reduced diameter.

3. A reusable blind fastener according to claim 1 wherein said screw means includes a fastener member with a threaded portion at one end receivable in said threaded bore, an intermediate stepped shouldered portion on which said expander member is rotatively positioned and a tool engaging portion at its opposite end and a cup-shaped cap member fixed to said tool engaging portion so as to partly enclose a portion of said retainer member and said expander member.

4. A reusable blind fastener adapted for passage into aligned apertures in a panel and a support panel comprising an expander member including a tubular body having an upper portion insertable into the apertures in the panel and support panel and a bottom portion with an annular shoulder therebetween extending radially outward from said upper portion for engagement with one side of the panel, said body having opposed axial extending slots in the outer periphery thereof with cam surfaces therein and a threaded axial bore therein, a retainer member including an apertured base member with a pair of spaced resilient legs extending from said base member and having equally projecting means adapted for engagement with one side of the support panel, said legs being slidably received in said slots and having cam engaging portions thereon for engagable coaction with said cam surfaces to effect bending movement of said legs relative to said base member upon axial relative movement between said retainer member and said expander member, and screw means including a threaded fastener with an inverted cup-shaped cap member fixed to one end thereof rotatively fixed to said base member of said retainer member with said threaded fastener engaged in said threaded axial bore of said expander member.

5. A reusable blind fastener according to claim 4 wherein said tubular body is provided with an axial extending recess in the outer periphery thereof, a flexible tapered leg integral with said bottom portion and extending axially adjacent and in spaced relation to said upper portion in said recess, with a portion of said tapered leg normally extending radially outward of the outer periphery of said upper portion.

* * * * *